US009419539B2

(12) United States Patent
Tenca (10) Patent No.: US 9,419,539 B2
(45) Date of Patent: Aug. 16, 2016

(54) SYSTEMS AND METHODS FOR ENHANCED OPERATION AND PROTECTION OF POWER CONVERTERS

(71) Applicant: General Electric Company, Schenectady, NY (US)

(72) Inventor: Pierluigi Tenca, Bavaria (DE)

(73) Assignee: General Electric Company, Niskayuna, NY (US)

( * ) Notice: Subject to any disclaimer, the term of this patent is extended or adjusted under 35 U.S.C. 154(b) by 63 days.

(21) Appl. No.: 14/467,220

(22) Filed: Aug. 25, 2014

(65) Prior Publication Data

US 2016/0056729 A1 Feb. 25, 2016

(51) Int. Cl.
*H02M 1/32* (2007.01)
*H02M 7/217* (2006.01)

(52) U.S. Cl.
CPC .............. *H02M 7/217* (2013.01); *H02M 1/32* (2013.01)

(58) Field of Classification Search
CPC ........... H02M 1/32; H02M 1/36; H02M 7/48; H02M 7/537; H02M 7/003; H02M 7/515; H02M 7/5155
USPC ............................. 363/50, 55, 56.01, 131, 135
See application file for complete search history.

(56) References Cited

U.S. PATENT DOCUMENTS

| | | | | |
|---|---|---|---|---|
| 4,307,442 A * | 12/1981 | Yano | .......................... | H02J 3/06 323/207 |
| 5,719,757 A * | 2/1998 | Beyerlein | ............ | H02M 1/4216 323/211 |
| 5,781,425 A * | 7/1998 | Karlsson | ................... | H02J 3/38 323/207 |
| 5,815,385 A * | 9/1998 | Hyttinen | ................... | H02J 3/36 363/34 |

(Continued)

FOREIGN PATENT DOCUMENTS

| CN | 103187722 A | 7/2013 |
|---|---|---|
| CN | 103715658 A | 4/2014 |

(Continued)

OTHER PUBLICATIONS

Liang, J. et al., "Current Source Modular Multilevel Converter for HVDC and FACTS," presented at EPE, Lille, France, Sep. 3, 2013, retrieved from http://www05.abb.com/global/scot/scot221.3nsf/veritydisplay/8d9c519eafb9dc41c1257be30028b888/$file/Current%20Source%20Modular%20Multilevel%20Converter%20for%20HVDC%20and%20FACTS.pdf (10 pgs).

(Continued)

*Primary Examiner* — Adolf Berhane
(74) *Attorney, Agent, or Firm* — Nitin N. Joshi (57) ABSTRACT

An electrical system includes an AC power source and a power converter including at least one first terminal and at least one second terminal. The first terminal is configured to receive voltages with a DC component and the second terminal is configured to receive voltages that have a non-zero time average value including AC and DC components. The electrical system also includes an AC power transmission subsystem coupled to and extending between the AC power source and the power converter. The electrical system further includes a current diversion system including a plurality of first switching devices coupled to the AC power transmission subsystem. The current diversion system also includes a second switching device including a third terminal coupled to the first terminal and a fourth terminal coupled to the second terminal. The second switching device is configured to transmit current only from the third terminal to the fourth terminal.

26 Claims, 4 Drawing Sheets

(56) References Cited

U.S. PATENT DOCUMENTS

| | | | |
|---|---|---|---|
| 5,907,483 A * | 5/1999 | Iio | H02M 7/1623 363/132 |
| 5,986,909 A | 11/1999 | Hammond et al. | |
| 7,706,157 B2 * | 4/2010 | Pearson | H02M 1/088 323/207 |
| 8,611,113 B2 | 12/2013 | Asplund | |
| 2010/0177541 A1 * | 7/2010 | Lee | H02J 3/18 363/127 |
| 2012/0051102 A1 * | 3/2012 | Wagoner | H02M 1/36 363/49 |
| 2013/0009491 A1 | 1/2013 | Häfner et al. | |
| 2013/0107601 A1 * | 5/2013 | Wagoner | H02M 7/003 363/141 |
| 2013/0119763 A1 * | 5/2013 | Zhu | H02M 1/36 307/43 |
| 2013/0208514 A1 | 8/2013 | Trainer et al. | |
| 2013/0301177 A1 * | 11/2013 | Wagoner | H02H 7/067 361/91.1 |
| 2015/0331967 A1 * | 11/2015 | Choi | G06F 17/50 703/6 |

FOREIGN PATENT DOCUMENTS

| | | |
|---|---|---|
| EP | 2590313 A1 | 5/2013 |
| WO | 2012041544 A1 | 4/2012 |
| WO | 2013060368 A1 | 5/2013 |
| WO | 2013071957 A1 | 5/2013 |
| WO | 2013093066 A1 | 6/2013 |
| WO | 2012116738 A1 | 9/2013 |
| WO | 2013127462 A1 | 9/2013 |
| WO | 2014029886 A2 | 2/2014 |

OTHER PUBLICATIONS

Axente, I., Basu, M., Conlon, M., Gaughan, K.: Protection of UPQC Against the Load Side Short Circuits. IET Power Electronic, vol. 3, 4, pp. 542-551. 2010.

European Search Report and Opinion issued in connection with corresponding EP Application No. 15180884.7 on May 6, 2016.

\* cited by examiner

SYSTEMS AND METHODS FOR ENHANCED OPERATION AND PROTECTION OF POWER CONVERTERS

BACKGROUND

The field of the disclosure relates generally to direct current (DC) transmission systems and, more particularly, to medium voltage DC (MVDC) and high voltage DC (HVDC) converter systems and methods of operation thereof.

At least some of known electric power transmission and distribution facilities are physically positioned in a remote geographical region or in an area where physical access is difficult. One example includes electric power transmission and distribution facilities geographically located in rugged and/or remote terrain, for example, mountainous hillsides, extended distances from electric power grids, and submerged, e.g., off-shore oil and gas exploration and recovery installations. Many of these known electric power transmission and distribution facilities include a separated power conversion assembly, or system, electrically coupled to an alternating current (AC) power source. Such known separated power conversion assemblies include a rectifier portion that converts the AC generated by the power generation facilities to direct current (DC) and an inverter portion that converts the DC to AC of a predetermined frequency and voltage amplitude. The rectifier portion of the separated power conversion assembly is positioned in close vicinity of the associated AC power source and the inverter portion of the separated full power conversion assembly is positioned in close vicinity of the powered loads. Such rectifier and inverter portions are typically electrically coupled via a MVDC or a HVDC link, e.g., a MVDC electric power distribution system or a HVDC electric power transmission system.

Since many of the known separated power conversion assemblies are remotely positioned, they are protected against accelerated reductions in service life due to short circuits, on the AC side and the DC link side through a variety of means. One method includes opening associated circuit breakers to isolate the affected power conversion assembly, thereby interrupting the current flow with the effect of de-energizing all downstream loads for an indeterminate period of time. Also, at least some of the known power conversion assemblies include oversized, more robust, and more costly components than would otherwise be necessary for easily accessible and redundant devices. Further, at least some of the known power conversion assemblies attempt to limit the current flow through the converter components by devices positioned in series with the principle current path using one of inductive devices, AC breakers, DC breakers, and reverting the polarity of the full bridge cells resident in the power converters.

BRIEF DESCRIPTION

In one aspect, an electrical system is provided. The electrical system includes an alternating current (AC) power source and a power converter including at least one first terminal and at least one second terminal. The at least one first terminal is configured to receive a voltage having a direct current (DC) component. The at least one second terminal is configured to receive a voltage having a non-zero time average value including an AC component and a DC component. The electrical system also includes an AC power transmission subsystem coupled to and extending between the AC power source and the power converter. The electrical system further includes a current diversion system including a plurality of first switching devices coupled to at least a portion of the AC power transmission subsystem. The current diversion system also includes at least one second switching device including a third terminal coupled to the at least one first terminal and a fourth terminal coupled to the at least one second terminal. The voltage between the at least one first terminal and the at least one second terminal has a positive time average value including an AC component and a DC component. The at least one second switching device is configured to transmit electric current only from the third terminal to the fourth terminal.

In a further aspect, a method of operating an electrical system is provided. The electrical system includes a power converter including an alternating current (AC) side and a direct current (DC) side. The power converter also includes at least one first terminal and at least one second terminal. The at least one first terminal is configured to receive a voltage having a direct current (DC) component. The at least one second terminal is configured to receive a voltage having a non-zero time average value including an AC component and a DC component. The electrical system also includes an AC power transmission subsystem coupled to the AC side of the power converter and a DC transmission system coupled to the DC side of the power converter. The electrical system further includes a current diversion system including a first portion and a second portion. The first portion of the current diversion system includes a plurality of first switching devices coupled to at least a portion of the AC power transmission subsystem. The second portion of the current diversion system includes at least one second switching device coupled to the at least one first terminal. The voltage between the at least one first terminal and the at least one second terminal has a positive time average value including an AC component and a DC component. The method includes detecting a short circuit condition upstream of the AC side of the power converter. The method also includes transmitting electric power from the DC transmission system to the first portion of the current diversion system through the second portion of the current diversion system.

In another aspect, a method of operating an electrical system is provided. The electrical system includes an alternating current (AC) source, a power converter including an AC side and a DC side, and an AC power transmission subsystem coupled to and extending between the AC power source and the AC side of the power converter. The electrical system further includes a current diversion system including a plurality of switching devices coupled to at least a portion of the AC power transmission subsystem. The method includes detecting a short circuit condition upstream of the DC side of the power converter. The method also includes transmitting electric power from the AC power transmission subsystem to the current diversion system.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The electric power systems, i.e., power converters and associated current diverting circuits described herein provide a cost-effective method for operating MVDC and HVDC electric power transmission and distribution systems. Specifically, the current diverting circuits described herein facilitate transmission of increased electric currents due to short circuits away from selected components in the standard electric power transmission paths, e.g., semiconductor-based devices such as thyristors and IGBTs in the power converters and the components in the associated DC links. Such diverting of current facilitates use of less rugged semiconductor devices and facilitates maintaining the semiconductor-based devices in service during the current excursion, rather than interrupt the current through devices such as a circuit breaker. In addition, such diverting of current facilitates reducing the capacitance values of the capacitors in the DC link required to absorb the energy induced during the short circuit transient since a large portion of the energy is diverted away from the capacitors in the DC link.

Figure 1:
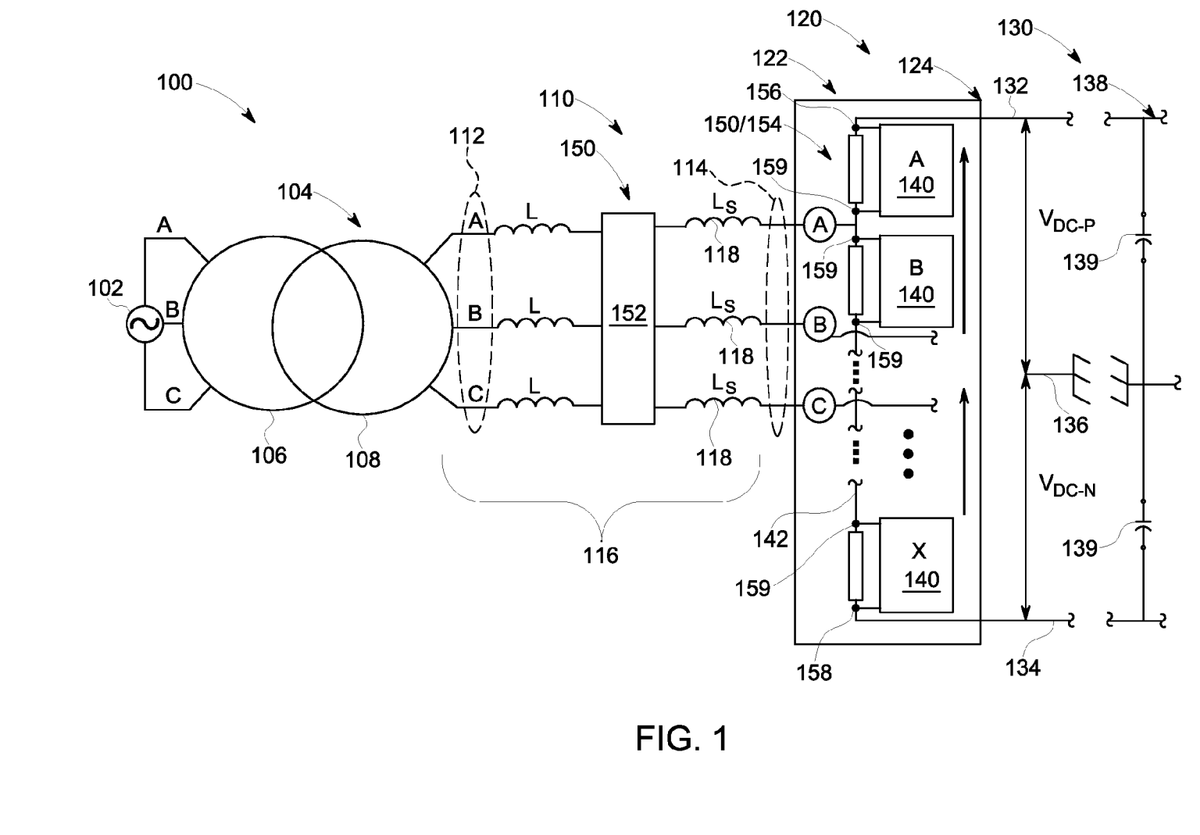
FIG. 1 is a schematic diagram of an exemplary electrical system.

FIG. 1 is a schematic diagram of an exemplary electrical system 100. Electrical system 100 includes an alternating current (AC) power source 102, e.g., without limitation, a multiphase, i.e., three-phase AC utility grid with the phases A, B, and C. Alternatively, any AC power source, including, without limitation, electric power generation facilities, e.g., power plants, are used to generate and transmit AC power to system 100. Also, alternatively, electrical system 100 is any electrical system that enables operation of system 10 as described herein, including, without limitation, a single-phase electrical system or a two-phase electrical system.

Electrical system 100 also includes a three-phase transformer 104 coupled to AC power source 102 that either steps-up or steps-down the voltage for each of the three phases A, B, and C from the voltage transmitted from AC power source 102 as a function of the voltage ratings of the downstream components in system 100. Transformer 104 includes primary windings 106 and secondary windings 108 electromagnetically coupled to each other. Electrical system 100 further includes an AC power transmission subsystem 110 that includes a plurality of electrically conducting elements 112 and 114 at least partially defining a three-phase electrical circuit 116. Each element 112 and 114 transmits one phase of AC electrical power. Each phase of elements 112 has a known inductance L. In some embodiments, inductance L represents the leakage inductances associated with transformer 104. Each phase of elements 114 includes a series inductor 118 having a known inductance of $L_S$.

Electrical system 100 also includes a three-phase power converter 120 coupled to AC power transmission subsystem 110 such that subsystem 110 extends between transformer 104 and power converter 120. Power converter 120 is any power conversion device with any internal topology that enables operation of electrical system 100 as described herein, including, without limitation, a modular multilevel converter (MMC) and a modular embedded multilevel converter (MEMC). Some embodiments of system 100 do not include transformer 104 and in those embodiments, AC power transmission subsystem 110 extends between AC power source 102 and power converter 120. In some of the embodiments where, for example, and without limitation, the topology of power converter 120 is a MMC, inductance $L_S$ includes the inductance values of the arms (not shown) of such topologies.

Power converter 120 includes an AC side 122 and a DC side 124 where AC power transmission subsystem 110 is coupled to AC side 122. Electrical system 100 further includes a high voltage direct current (HVDC) transmission system 130 that includes a positive electrically conducting element 132, a negative electrically conducting element 134, and a neutral or ground electrically conducting element 136. Alternatively, electrical system 100 is any DC system that enables operation of electrical system 100 as described herein, including, without limitation, a medium voltage direct current (MVDC) transmission system and a MVDC distribution system. A positive DC voltage of $V_{DC-P}$ is induced between elements 132 and 136 and a negative DC voltage of $V_{DC-N}$ is induced between elements 134 and 136. HVDC transmission system 130 also includes a DC link 138 including a plurality of capacitive devices 139.

Power converter 120 also includes a plurality of cells 140 (only those for the A phase are shown and the configuration of B-phase cells and C-phase cells are substantially similar) coupled in series through a converter phase electrically conducting element 142 that is coupled to A-phase element of elements 114. Cells 140 are labeled, from highest voltage to lowest voltage, i.e., A, B, and so on through the $X^{th}$ cell, where X is a variable representative of the total number of cells 140 rather than the $24^{th}$ cell 140.

Electrical system 100 further includes a current diversion system 150 including a first portion 152 and a second portion 154. First portion 152 includes a plurality of first switching devices (not shown in FIG. 1) coupled to at least a portion of AC power transmission subsystem 110. In the exemplary embodiment, first portion 152 is coupled to, and extends between elements 112 and 114. Second portion 154 includes a plurality of second switching devices (not shown in FIG. 1), each coupled to a first DC terminal 156 of power converter 120 coupled to positive electrically conducting element 132 and a second DC terminal 158 of power converter 120 coupled to negative electrically conducting element 134. First DC terminal 156 and second DC terminal 158 are configured to receive voltages that have a primary DC component, i.e., the voltages may have a predetermined ripple. Second portion 154 also includes a plurality of intermediate terminals 159 that are configured to receive voltages that have at least one AC component and a DC component such that the voltages have a non-zero time average value. Therefore, the voltage difference between first DC terminal 156 and corresponding intermediate terminal 159, the voltage difference between second DC terminal 158 and corresponding intermediate terminal 159, and the voltage difference between the adjacent intermediate terminals 159 have at least one AC component and a DC component such that the voltage differential values have a positive, time average value.

Figure 2:
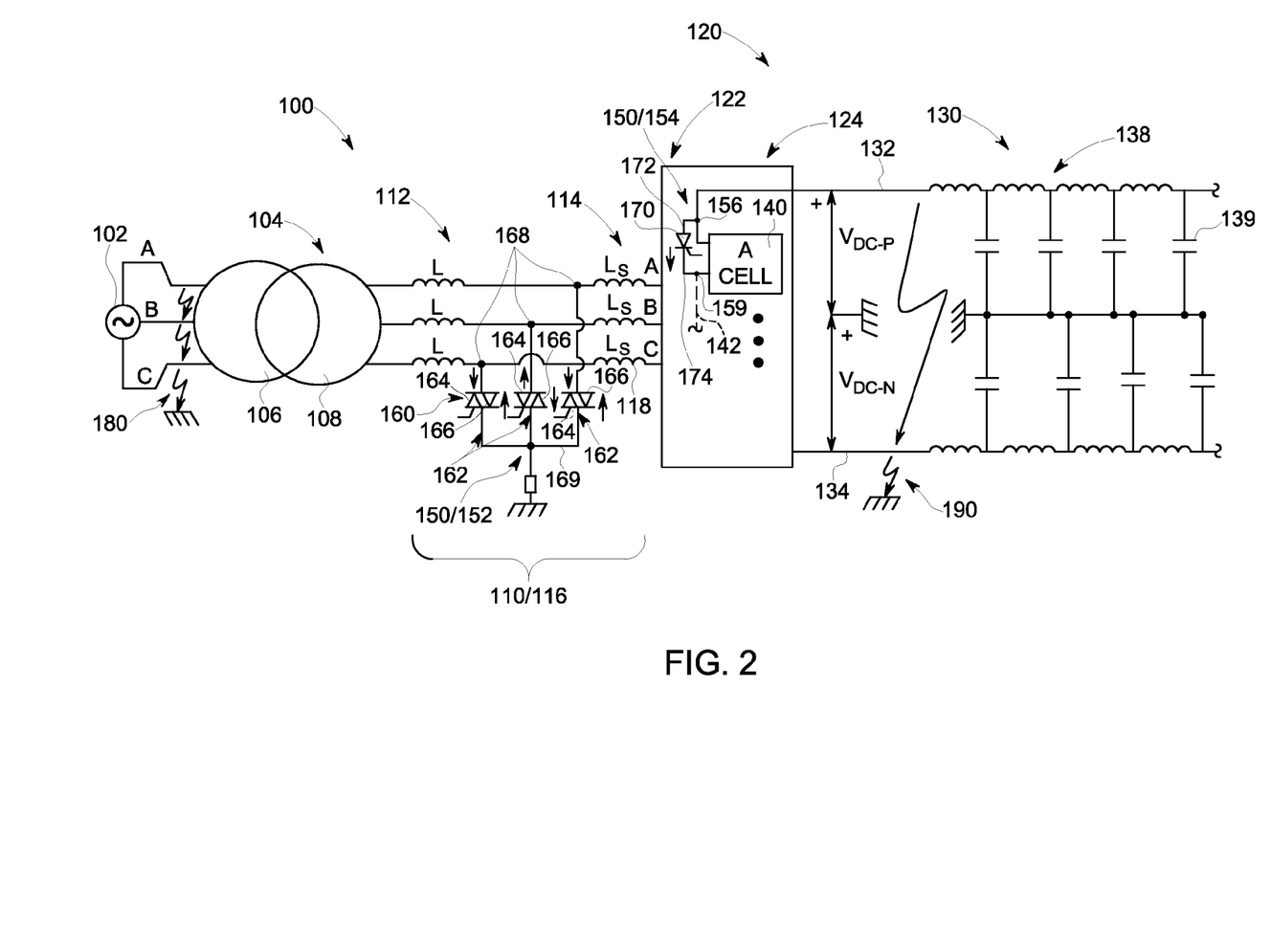
FIG. 2 is a schematic diagram of an exemplary current diversion system that may be used with the electrical system shown in FIG. 1.

FIG. 2 is a schematic diagram of current diversion system 150 that is used with electrical system 100. In the exemplary embodiment, current diversion system 150 includes first portion 152 that includes a plurality of first switching devices 160 coupled to AC power transmission subsystem 110. First switching devices 160 includes a plurality of, i.e., three switching device pairs 162 that each include a transmission controllable switch 164 and an anti-paralleling diode 166 coupled in parallel to each other. In the exemplary embodiment, transmission controllable switches 164 are thyristors, for example, and without limitation, semiconductor-based gate turn-off (GTO) thyristors and insulated-gate bipolar transistors (IGBTs). Alternatively, transmission controllable switches 164 are any controllable switch that enables operation of current diversion system 150 and electrical system 100 as described herein, including, without limitation, electro-mechanical switches, e.g., without limitation, microswitches. In some embodiments, semiconductor-based switches and mechanical switches may be mixed together. However, at least one of first switch devices 160 is not a mechanical switch.

In the exemplary embodiment, switching device pairs 162 are coupled to each of A-phase, B-phase, and C-phase of AC power transmission subsystem 110 in a wye-connected configuration at AC terminals 168, and, as such, first portion 152 is a multipole device. Alternatively, switching device pairs 162 are coupled to each of A-phase, B-phase, and C-phase of AC power transmission subsystem 110 in any configuration that enables operation of current diversion system 150 and electrical system 100 as described herein, including, without limitation, a delta-connected configuration and, in some embodiments, an asymmetrical arrangement connecting only two phases is used. AC terminals 168 are positioned upstream of series inductors 118 to induce a high impedance between first portion 152 and power converter 120 for diverting current from AC power transmission subsystem 110 through first portion 152 when first portion 152 is placed into service (described further below). Transmission controllable switches 164 are configured into thyristor stacks. Switching device pairs 162 are coupled to each other at a ground bus 169.

Also, in the exemplary embodiment first portion 152 is coupled to ground potential at ground bus 169, and as such, first portion 152 is configured to transmit at least a portion of current to ground when transmission controllable switches 164 are placed into operation. More specifically, transmission controllable switches 164 are oriented to transmit current to ground from elements 112 and 114 for the A-phase and the C-phase as shown by the arrows. When first portion 152 is not placed in to service, the associated transmission controllable switches 164 prevent current flow in either direction. The corresponding diodes 166 for the A-phase and the C-phase are oriented to facilitate current flow back into the A-phase and the C-phase elements 112 from ground bus 169 as shown by the arrows, where inductance $L_S$ provides sufficient impedance to current flow to facilitate diverting the AC current away from power converter 120 and toward element 112. Also, diodes 166 for the A-phase and the C-phase prevent current flow from the A-phase and the C-phase elements 112 and 114 to ground.

Transmission controllable switch 164 for the B-phase element 112 is configured to transmit current from ground bus 169 to element 112 as shown by the arrow, where inductance $L_S$ provides sufficient impedance to current flow to facilitate diverting the AC current away from power converter 120 and toward element 112. When first portion 152 is not placed into service, the associated transmission controllable switch 164 prevents current flow in any direction. The corresponding diode 166 for the B-phase elements 112 and 114 is oriented to facilitate current flow from the B-phase elements 112 and 114 to ground as shown by the arrow when first portion 152 is placed into service. When first portion 152 is not placed into service, the associated diode 166 for the B-phase elements 112 and 114 prevents current flow in any direction.

The purpose for the orientation of switches 164 and diodes 166 is to control current flow associated with a three-phase short to ground when first portion 152 is placed into service. Specifically, first portion 152 defines a bi-directional bridge with predetermined sinks where current is facilitated to flow toward. More specifically, first portion 152 facilitates transmitting a portion of the current to ground bus 169 and facilitates transmission of other portions of the current through other portions of elements 112 away from power converter 120 by leveraging the inductance $L_S$. In addition to transmission toward ground bus 169, current is permitted to flow from each of the A-phase, the B-phase, and the C-phase toward any of the other two phases. As such, the instantaneous current in at least one AC terminal 168 of the multipole can be different from the instantaneous current in a corresponding AC terminal on AC side 122 of power converter 120.

Alternatively, any configuration of first portion 152 of current diversion system 150 that enables operation of current diversion system 150 and electrical system 100 as described herein is used. The configuration of switching device pairs 162 that includes transmission controllable switches 164 and anti-paralleling diodes 166 facilitates using transmission controllable switches 164, i.e., thyristors of lower voltage ratings that would otherwise be required without diodes 166.

Also, in the exemplary embodiment, current diversion system 150 includes second portion 154 that includes a second switching device, i.e., a converter controllable switch 170 coupled to each cell 140 at first DC terminal 156 and second DC terminal 158 (only those for the A phase are shown and the configuration of B-phase and C-phase cells and switching devices are substantially similar). Alternatively, any number of converter controllable switches 170 is coupled to each cell 140. In the exemplary embodiment, converter controllable switches 170 are thyristors, for example, and without limitation, semiconductor-based gate turn-off (GTO) thyristors and insulated-gate bipolar transistors (IGBTs). Alternatively, converter controllable switches 170 are any controllable switch that enables operation of current diversion system 150 and electrical system 100 as described herein.

Therefore, for A-cell 140, a first terminal, i.e., first DC terminal 156 and a second terminal, i.e., corresponding intermediate terminal 159 are previously discussed. The converter controllable switch 170 coupled to A-cell 140 includes a third terminal, i.e., an anode 172 coupled to first DC terminal 156 and includes a fourth terminal, i.e., a cathode 174 coupled to corresponding intermediate terminal 159. Similarly, the converter controllable switch 170 coupled to X-cell 140 (shown in FIG. 1) includes a cathode 174 coupled to second DC terminal 158 and an anode 172 coupled to corresponding intermediate terminal 159 (none shown in FIG. 2 for C-cell 140). Also, similarly, for the cells 140 between A-cell 140 and X-cell 140, e.g., B-cell 140 (shown in FIG. 1), the associate anode 172 and cathode 174 are coupled to associated intermediate terminals 159 (neither shown in FIG. 2).

In those alternative embodiments where it is not possible to couple converter controllable switches 170 across each cell 140 due to either space constraints or excessive dv/dt across switches 170 and cells 140, switches 170 are concentrated in a switch component external to power converter 120, e.g., and without limitation, a full thyristor stack across DC link 138 extending between positive element 132 and negative element 134. Regardless of the configuration, switches 170 are configured to only transmit current there through from anode 172 to cathode 174.

In operation, AC power source 102 transmits three-phase AC power to primary windings 106 of transformer 104. In the exemplary embodiment, transformer 104 is a step-up transformer and an increased voltage is induced on secondary windings 108. AC power is transmitted through elements 112 and 114 to power converter 120. AC power is converted to DC power at voltages of $V_{DC-P}$ and $V_{DC-N}$ through cells 140 and DC power is transmitted to HVDC transmission system 130. DC link 138 and capacitors 139 facilitate maintaining voltages $V_{DC-P}$ and $V_{DC-N}$ on HVDC transmission system 130 as it transmits HVDC power to DC loads and another power converter 120 for conversion from DC power to AC power. Also, under some circumstances, DC power to AC power conversion is performed through power converter 120 to power AC loads coupled to elements 112 and 114 and on the AC power source side of transformer 104.

Also, in operation, in the event of a short circuit upstream of AC side 122 of power converter 120, first portion 152 and second portion 154 of current diversion system 150 are placed into operation from a non-operating condition. In the exemplary embodiment, a short circuit fault to ground 180 is shown upstream of transformer 104 associated with AC power source 102. Electric system 100 includes the necessary electric measuring devices (not shown) to determine that fault 180 is present. The subsequent decrease in AC voltage on AC power transmission subsystem 110 facilitates current flow from DC link 138 of HVDC transmission system 130 through power converter 120 toward fault 180. Converter controllable switches 170 and transmission controllable switches 164 are turned on. Electric power is transmitted from HVDC transmission system 130 to first portion 152 of current diversion system 150 through second portion 154 of current diversion system 150. Specifically, DC current is transmitted through converter controllable switches 170, thereby bypassing cells 140. As such, switches 170 regulate current flow from HVDC transmission system 130 to AC side 122 of each cell 140, thereby reducing the current flow through each cell 140. The DC current is converted to AC current by converter controllable switches 170 and the AC current is transmitted from converter controllable switches 170 to first portion 152 of current diversion system 150 through AC power transmission subsystem 110.

Further, in operation, in the event of a short circuit upstream of AC side 122 of power converter 120, when first portion 152 is placed into service, first portion 152 defines a bi-directional bridge with predetermined sinks where current is facilitated to flow toward. Specifically, as indicated by the arrows, first portion 152 facilitates transmitting a portion of the current to ground bus 169 and facilitates transmission of other portions of the current through other portions of elements 112 away from power converter 120 by leveraging the inductance $L_S$. In addition to transmission toward ground bus 169, current is permitted to flow from each of the A-phase, the B-phase, and the C-phase toward any of the other two phases, as indicated by the associated arrows.

More specifically, switches 164 and diodes 166 of switching device pairs 162 prevent current flow when first portion 152 is not in service. When placed in service, at least a portion of current is transmitted to ground bus 169 when transmission controllable switches 164 elements 112 and 114 for the A-phase and the C-phase are placed into operation. The corresponding diodes 166 for the A-phase and the C-phase transmit current flow back into the A-phase and the C-phase elements 112 from ground bus 169 as shown by the arrows, where inductance $L_S$ provides sufficient impedance to current flow to facilitate diverting the AC current away from power converter 120 and toward element 112. Transmission controllable switch 164 for the B-phase element 112 transmits current from ground bus 169 to element 112, where inductance $L_S$ provides sufficient impedance to current flow to facilitate diverting the AC current away from power converter 120 and toward element 112. The corresponding diode 166 for the B-phase elements 112 and 114 transmit current flow from the B-phase elements 112 and 114 to ground bus 169.

In addition to the inductances $L_S$ associated with elements 114, the inductances L associated with elements 112 facilitate providing sufficient impedance to current flow to reduce current transmission toward secondary windings 108 of transformer 104 though elements 112 and facilitate directing the AC current away from transformer 104 and toward first portion 152.

Further, in operation, in the event of a short circuit downstream of DC side 124 of power converter 120, first portion 152 of current diversion system 150 is placed into operation from a non-operating condition as described above. In the exemplary embodiment, a short circuit fault to ground 190 is shown downstream of power converter 120 associated with DC link 138. Electric system 100 includes the necessary electric measuring devices (not shown) to determine that fault 190 is present. The subsequent decrease in DC voltage on DC link 138 facilitates current flow from AC power source 102 through transformer 104, AC power transmission subsystem 110, and power converter 120 into DC link 138 toward fault 190. First portion 152 of current diversion system 150 is placed into service and regulates electric power transmission from AC power transmission subsystem 110 to ground bus 169 and within subsystem 110 as described above.

Figure 3:
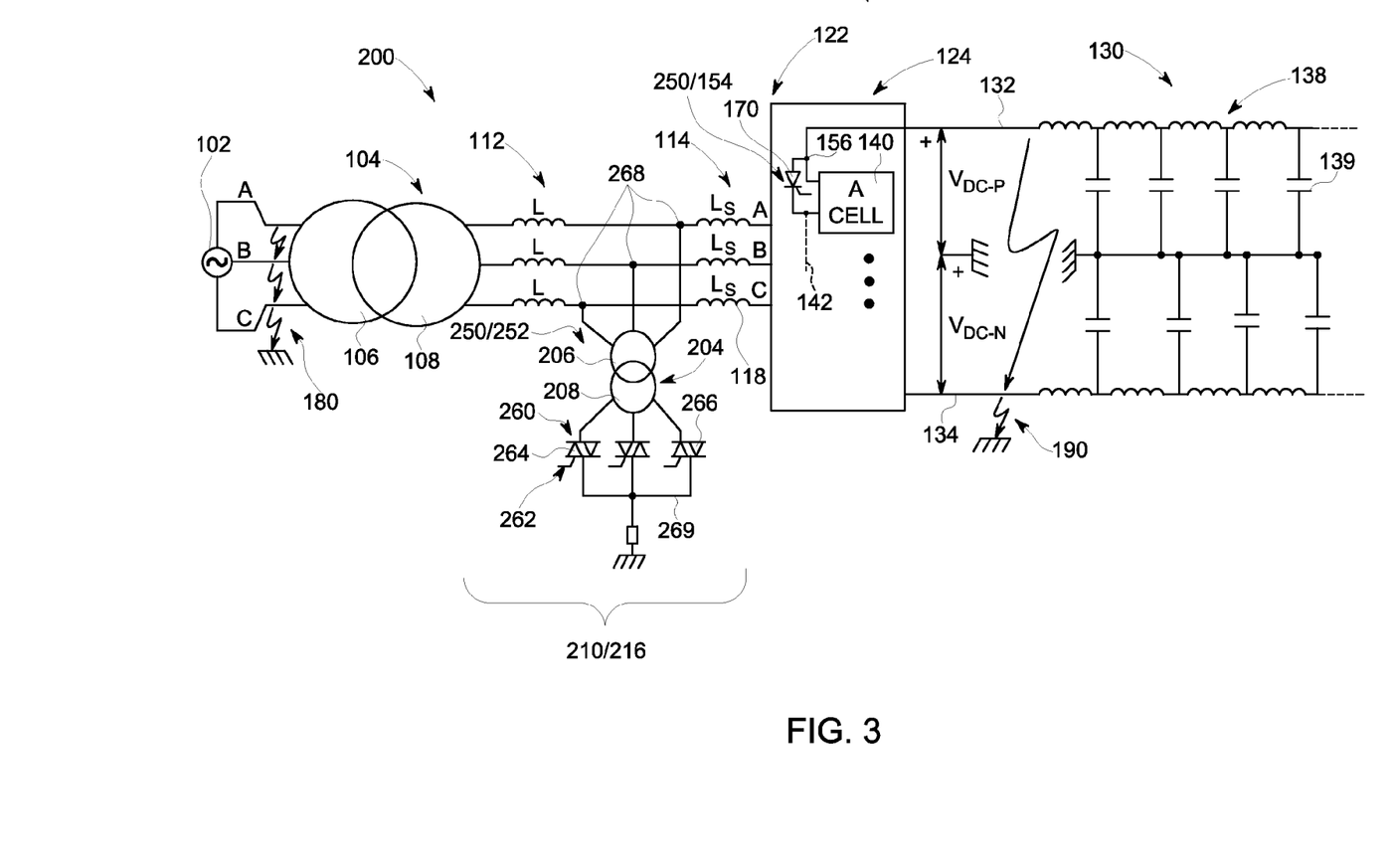
FIG. 3 is a schematic diagram of an alternative current diversion system that may be used with the electrical system shown in FIG. 1.

FIG. 3 is a schematic diagram of an alternative current diversion system 250 that may be used with either electrical system 100 (shown in FIG. 1) or an alternative electrical system 200. Electrical system 200 includes current diversion system 250 that is similar to current diversion system 150 with the exception that system 250 includes an alternative first portion 252 that includes a step-down transformer 204 coupled to an alternative AC transmission subsystem 210 through AC terminals 268, thereby defining an alternative three-phase electrical circuit 216. Step-down transformer 204 includes primary windings 206 and secondary windings 208 electromagnetically coupled to each other. Also, current diversion system 250 includes alternative first switching devices 260 that include alternative switching device pairs 262 that further include alternative transmission controllable switches 264 and diodes 266 coupled to ground bus 269. Step-down transformer 204 decreases the voltage to transmission controllable switches 264, thereby facilitating a further decrease in the voltage ratings of the thyristors from those ratings described for current diversion system 150 and switches 164 (both shown in FIG. 2). However, the current ratings of switches 264 are greater than those for switches 164. The leakage inductances of transformer 204 are less than $L_S$. Alternatively, transformer 204 is any transformer that enables operation of electrical system 200 and current diversion system 250 as described herein, including, without limitation, a step-up transformer.

Operation of current diversion system 250 and electrical system 200 are similar to that described above for systems 150 and 100 with the exception that the voltage of the AC power transmitted through transmission controllable switches 264 is stepped-down and the current stepped-up as it is diverted away from power converter 120 and transformer 104 for faults 190 and 180, respectively.

Figure 4:
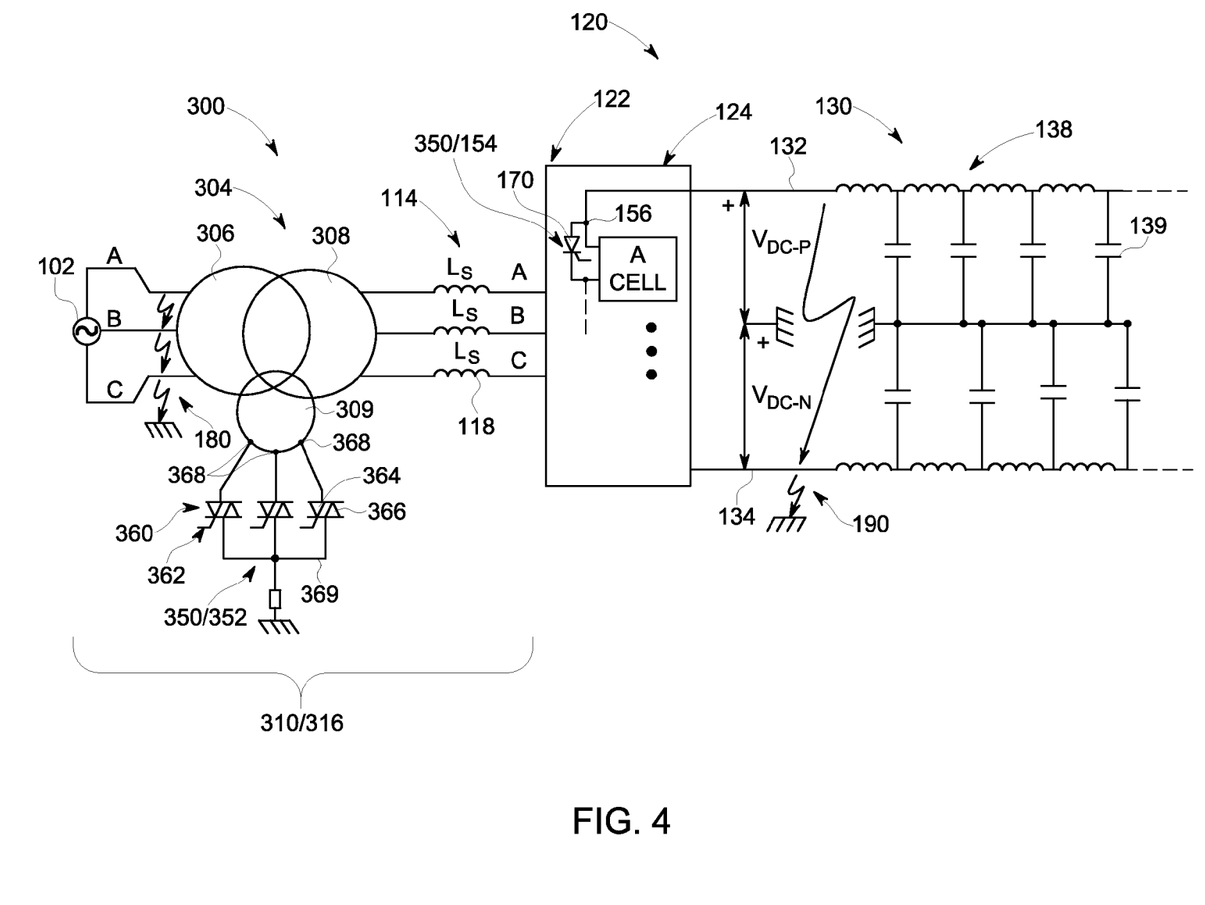
FIG. 4 is a schematic diagram of another alternative current diversion system that may be used with the electrical system shown in FIG. 1.

FIG. 4 is a schematic diagram of another alternative current diversion system 350 that may be used with either electrical system 100 (shown in FIG. 1) or an alternative electrical system 300. Electrical system 300 is similar to electrical systems 100 and 200 (shown in FIG. 3) with the exceptions that transformer 104 is replaced with transformer 304 and elements 112 (shown in FIGS. 1, 2, and 3) are removed. Transformer 304 includes primary windings coupled to power source 102, secondary windings 308 coupled to elements 114 of AC power transmission subsystem 310 (defining three-phase electrical circuit 316), and tertiary windings 309 coupled to an alternative current diversion system 350. Primary windings 306, secondary windings 308, and tertiary windings 309 are electromagnetically coupled to each other. The leakage inductances of transformer 304 are less than $L_S$.

As such, electrical system 300 includes current diversion system 350 that is similar to current diversion system 250 with the exception that system 350 includes an alternative first portion 352 that, rather than step-down transformer 204, is coupled to tertiary windings 309 of transformer 304 at AC terminals 368. Current diversion system 350 includes alternative first switching devices 360 that includes alternative switching device pairs 362 that further includes alternative transmission controllable switches 364 and diodes 366 coupled to ground bus 369. Tertiary windings 309 of transformer 304 decreases the voltage to transmission controllable switches 364, thereby facilitating a further decrease in the voltage ratings of the thyristors from those ratings described for current diversion system 150 and switches 164 (both shown in FIG. 2). However, the current ratings of switches 364 are greater than those for switches 164.

Operation of current diversion system 350 and electrical system 300 are similar to that described above for systems 250 and 200 in that the voltage of the AC power transmitted through transmission controllable switches 364 is stepped-down and the current stepped-up as it is diverted away from power converter 120 and transformer 304 for faults 190 and 180, respectively.

The above-described electric power systems, i.e., power converters and associated current diverting circuits described herein provide a cost-effective method for operating MVDC and HVDC electric power transmission and distribution systems. Specifically, the current diverting circuits described herein facilitate transmission of increased electric currents due to short circuits away from selected components in the standard electric power transmission paths, e.g., semiconductor-based devices such as thyristors and IGBTs in the power converters and the components in the associated DC links. Such diverting of current facilitates use of less rugged semiconductor devices and facilitates maintaining the semiconductor-based devices in service during the current excursion, rather than interrupt the current through devices such as a circuit breaker. In addition, such diverting of current facilitates reducing the capacitance values of the capacitors in the DC link required to absorb the energy induced during the short circuit transient since a large portion of the energy is diverted away from the capacitors in the DC link An exemplary technical effect of the methods, systems, and apparatus described herein includes at least one of: (a) diverting short circuit currents away from the semiconductor-based devices in power converters and capacitive devices in DC links and reducing reliance on wholesale circuit interruption for protection; (b) diverting current generated on the AC side of a power converter away from a power converter during a DC fault; (c) diverting current generated on the DC side of the power converter around the semi-conductor-based devices in the power converter during an AC fault; (d) maintaining the semiconductor-based devices in power converters in service during a fault on the AC side or the DC side of the power converter; (e) facilitating use of cheaper, more available controllable switches in power converters and current diverting circuits; and (f) extend the period of time to opening of AC breakers to isolate a fault by diverting a significant portion of the fault current through a parallel path for at least a short period of time.

Exemplary embodiments of methods, systems, and apparatus for operating electric power systems are not limited to the specific embodiments described herein, but rather, components of systems and/or steps of the methods may be utilized independently and separately from other components and/or steps described herein. For example, the methods may also be used in combination with other systems requiring current diversion during faults, and are not limited to practice with only the systems and methods as described herein. Rather, the exemplary embodiment can be implemented and utilized in connection with many other applications, equipment, and systems that may benefit from such current diversion.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. An electrical system comprising:
an alternating current (AC) power source;
a power converter comprising at least one first terminal and at least one second terminal, wherein said at least one first terminal is configured to receive a voltage having a direct current (DC) component, and said at least one second terminal configured to receive a voltage having a non-zero average value including an AC component and a DC component;
an AC power transmission subsystem coupled to and extending between said AC power source and said power converter; and
a current diversion system comprising:
a plurality of first switching devices coupled to at least a portion of said AC power transmission subsystem; and
at least one second switching device comprising a third terminal coupled to said at least one first terminal and a fourth terminal coupled to said at least one second terminal, wherein the voltage between said at least one first terminal and said at least one second terminal has a positive time average value including an AC component and a DC component, said at least one second switching device configured to transmit electric current only from said third terminal to said fourth terminal;
wherein the plurality of first switching devices when activated facilitate a transmission of a portion of AC current to a ground bus.

2. The electrical system in accordance with claim 1, wherein said plurality of first switching devices is a multipole device coupled to at least a portion of said AC power transmission subsystem.

3. The electrical system in accordance with claim 1, wherein said plurality of first switching devices comprises a plurality of switching device pairs, wherein each switching device pair of said plurality of switching device pairs comprises a controllable switch.

4. The electrical system in accordance with claim 3, wherein said each switching device pair of said plurality of switching device pairs further comprises a diode coupled in parallel to said controllable switch.

5. The electrical system in accordance with claim 4, wherein said AC power transmission subsystem comprises a plurality of electrically conducting elements at least partially defining a multiphase electrical circuit, each electrically conducting element of said plurality of electrically conducting elements configured to transmit one phase of AC electrical power.

6. The electrical system in accordance with claim 5, wherein said each switching device pair of said plurality of switching device pairs is coupled to one phase of said multiphase electrical circuit.

7. The electrical system in accordance with claim 5 further comprising a transformer coupled to said plurality of first switching devices and coupled to said plurality of electrically conducting elements.

8. The electrical system in accordance with claim 1, wherein said power converter comprises a plurality of cells coupled in series, said at least one second switching device comprises a plurality of second switching devices, and at least one second switching device of said plurality of second switching devices coupled to at least one cell of said plurality of cells.

9. The electrical system in accordance with claim 1, wherein said at least one second switching device is a thyristor.

10. The electrical system in accordance with claim 1, wherein said AC power transmission subsystem comprises a transformer comprising primary, secondary, and tertiary windings, said tertiary windings coupled to said plurality of first switching devices.

11. The electrical system in accordance with claim 1, wherein at least one first switching device of said plurality of first switching devices is not a mechanical switching device.

12. The electrical system in accordance with claim 1, wherein the plurality of first switching devices are activated when a short circuit fault is detected on the electrical system.

13. The electrical system in accordance with claim 1, wherein the current diversion system is devoid of capacitors.

14. The electrical system in accordance with claim 1, wherein the at least one second switching device when in operation partially bypasses at least a portion of the plurality of cells of the power converter.

15. A method of operating an electrical system, the electrical system including a power converter including an alternating current (AC) side and a direct current (DC) side, the power converter also including at least one first terminal and at least one second terminal, the at least one first terminal configured to receive a voltage having a direct current (DC) component, and the at least one second terminal configured to receive a voltage having a non-zero time average value including an AC component and a DC component, the electrical system also including an AC power transmission subsystem coupled to the AC side of the power converter, and a DC transmission system coupled to the DC side of the power converter, the electrical system further including a current diversion system including a first portion and a second portion, wherein the first portion of the current diversion system includes a plurality of first switching devices coupled to at least a portion of the AC power transmission subsystem, and the second portion of the current diversion system includes at least one second switching device coupled to the at least one first terminal, wherein the voltage between the at least one first terminal and the at least one second terminal has a positive time average value including an AC component and a DC component, said method comprising:
detecting a short circuit fault upstream of the AC side of the power converter; and
transmitting electric power from the DC transmission system to the first portion of the current diversion system through the second portion of the current diversion system;
wherein the plurality of first switching devices when activated facilitate a transmission of a portion of AC current to a ground bus.

16. The method in accordance with claim 15, wherein the power converter includes a plurality of cells coupled in series, each cell of the plurality of cells includes the first terminal and the second terminal, the at least one second switching device including a third terminal coupled to the first terminal and a fourth terminal coupled to the second terminal, the at least one second switching device configured to transmit electric current only from the third terminal to the fourth terminal, wherein transmitting electric power from the DC transmission system comprises:
transmitting DC current through the at least one second switching device and at least partially bypassing at least a portion of the plurality of cells;
converting the DC current to AC current with the at least one second switching device; and
transmitting the AC current from the at least one second switching device to the first portion of the current diversion system.

17. The method in accordance with claim 16, wherein transmitting DC current through the at least one second switching device and at least partially bypassing at least a portion of the plurality of cells comprises regulating current flow from the DC transmission system to the AC side of each cell of the plurality of cells thereby reducing the current flow through each cell of the plurality of cells.

18. The method in accordance with claim 15, wherein the plurality of first switching devices includes a plurality of switching device pairs, wherein each switching device pair of the plurality of switching device pairs coupled to a portion of the AC power transmission subsystem, wherein transmitting electric power from the DC transmission system comprises transmitting AC electric power from the AC power transmission subsystem through the first switching devices.

19. The method in accordance with claim 18, wherein the AC power transmission subsystem includes a plurality of electrically conducting elements at least partially defining a multiphase electrical circuit, each electrically conducting element of the plurality of electrically conducting elements coupled to one phase of the multiphase electrical circuit, each switching device pair of the plurality of switching device pairs coupled to a corresponding electrically conducting element of the plurality of electrically conducting elements, wherein transmitting AC electric power from the AC power transmission subsystem through the plurality of first switching devices comprises transmitting at least a portion of AC electric power from a first electrically conducting element of the plurality of electrically conducting elements to a second electrically conducting element of the plurality of electrically conducting elements.

20. The method in accordance with claim 15, wherein the first portion of the current diversion system further includes a transformer coupled to the plurality of first switching devices and coupled to the plurality of electrically conducting elements, wherein transmitting electric power from the DC transmission system comprises decreasing an AC voltage from the AC power transmission subsystem to the plurality of first switching devices.

21. A method of operating an electrical system, the electrical system including an alternating current (AC) source, a power converter including an AC side and a DC side, and an AC power transmission subsystem coupled to and extending between the AC power source and the AC side of the power converter, the electrical system further including a current diversion system including a plurality of switching devices coupled to at least a portion of the AC power transmission subsystem, said method comprising:
    detecting a short circuit fault upstream of the DC side of the power converter; and
    transmitting electric power from the AC power transmission subsystem to the current diversion system;
    wherein the plurality of switching devices when activated facilitate a transmission of a portion of AC current to a ground bus.

22. The method in accordance with claim 21, wherein transmitting electric power from the AC power transmission subsystem to the current diversion system comprises regulating current flow from the AC power source to the AC side of the power converter thereby reducing the current flow through the power converter.

23. The method in accordance with claim 21, wherein the plurality of switching devices includes a plurality of switching device pairs, wherein each switching device pair of the plurality of switching device pairs includes a controllable switch, at least one switching device pair of the plurality of switching device pairs coupled to a portion of the AC power transmission subsystem, wherein transmitting electric power from the AC power transmission subsystem to the current diversion system comprises transmitting AC electric power from the AC power transmission subsystem through the plurality of controllable switches.

24. The method in accordance with claim 23, wherein the AC power transmission subsystem includes a plurality of electrically conducting elements at least partially defining a multiphase electrical circuit, each electrically conducting element of the plurality of electrically conducting elements configured to transmit one phase of AC electrical power, each of the switching device pairs of the plurality of switching device pairs coupled to a corresponding electrically conducting element of the plurality of electrically conducting elements, wherein transmitting AC electric power from the AC power transmission subsystem through the plurality of controllable switches comprises transmitting at least a portion of AC electric power from a first electrically conducting element of the plurality of electrically conducting elements to a second electrically conducting element of the plurality of electrically conducting elements.

25. The method in accordance with claim 21, wherein the current diversion system further includes a transformer including a first side coupled to the plurality of switching devices and a second side coupled to the plurality of electrically conducting elements, wherein transmitting electric power from the AC power transmission subsystem comprises modifying an AC voltage from the AC power transmission subsystem to the plurality of switching devices.

26. The method in accordance with claim 21, wherein the AC power transmission subsystem includes a transformer including primary, secondary, and tertiary windings, the tertiary windings coupled to the plurality of switching devices and the primary and secondary windings coupled to the plurality of electrically conducting elements, wherein transmitting electric power from the AC power transmission subsystem comprises decreasing an AC voltage from the AC power transmission subsystem to the plurality of switching devices.

\* \* \* \* \*